US006685278B2

United States Patent
Kusano et al.

(12) United States Patent
(10) Patent No.: US 6,685,278 B2
(45) Date of Patent: Feb. 3, 2004

(54) BRAKE CONTROL DEVICE FOR A VEHICLE

(75) Inventors: Akihito Kusano, Toyota (JP); Yasuo Konishi, Toyoake (JP); Junji Ishimura, Toyota (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/842,849

(22) Filed: Apr. 27, 2001

(65) Prior Publication Data
US 2002/0000752 A1 Jan. 3, 2002

(30) Foreign Application Priority Data
Apr. 27, 2000 (JP) ........................................ 2000-127872

(51) Int. Cl.[7] ................................................. B60T 8/34
(52) U.S. Cl. ................................. 303/113.4; 303/116.2; 303/119.1; 303/122.11
(58) Field of Search .......................... 303/115.1, 116.2, 303/116.1, 119.1, 113.2, 113.4, 122.12, 122.11, 122.05

(56) References Cited

U.S. PATENT DOCUMENTS

| | | | | |
|---|---|---|---|---|
| 4,753,490 A | * | 6/1988 | Belart et al. | 303/114 |
| 4,812,777 A | * | 3/1989 | Shirai | 303/14 |
| 4,989,925 A | | 2/1991 | Kohno | |
| 5,261,730 A | * | 11/1993 | Steiner et al. | 303/113.4 |
| 5,836,659 A | * | 11/1998 | Feigel et al. | 303/115.2 |
| 5,887,954 A | * | 3/1999 | Steiner et al. | 303/113.4 |
| 6,079,793 A | * | 6/2000 | Takayama et al. | 303/14 |
| 6,247,762 B1 | * | 6/2001 | Kusano et al. | 303/3 |
| 6,290,310 B1 | * | 9/2001 | Kusano | 303/122.11 |
| 6,302,497 B1 | * | 10/2001 | Takayama | 303/114.1 |

FOREIGN PATENT DOCUMENTS

| | | |
|---|---|---|
| DE | 2 316 986 A | 3/1998 |
| DE | 196 36 432 A1 | 3/1998 |
| DE | 197 53 786 A1 | 6/1999 |
| JP | 11-255107 A * | 9/1999 |

* cited by examiner

*Primary Examiner*—Matthew C. Graham
*Assistant Examiner*—Mariano Sy
(74) *Attorney, Agent, or Firm*—Burns, Doane, Swecker & Mathis, LLP (57) ABSTRACT

A brake control device for a vehicle includes a master cylinder, a wheel cylinder, a brake pedal behavior simulator, a normally-open type electromagnetic valve, a normally-closed type electromagnetic valve, and a brake pressure control device. The brake pressure control device includes a pump, a reservoir, and two electromagnetic valves to increase and decrease wheel cylinder hydraulic pressure. When the brake pressure control device is normally operated, a hydraulic pressure in the wheel cylinder is controlled by the brake pressure control device. On the other hand, when the brake pressure control device malfunctions or is abnormally operating, the wheel cylinder hydraulic pressure is controlled by hydraulic pressure generated from the master cylinder. At least the normally-closed type electromagnetic valve is opened when the brake pedal is in the non-operational state.

18 Claims, 5 Drawing Sheets

BRAKE CONTROL DEVICE FOR A VEHICLE

This application is based on and claims priority under 35 U.S.C. § 119 with respect to Japanese Application No. 2000-127872 filed on Apr. 27, 2000, the entire content of which is incorporated herein by reference.

FIELD OF THE INVENTION

This invention generally relates to vehicle brake systems. More particularly, the present invention pertains to a brake control device provided with a brake pedal behavior simulator and a brake pressure control device. The invention also pertains to a brake control device having the brake pressure control device arranged to carry out an anti-skid control or other braking controls such as sudden braking.

BACKGROUND OF THE INVENTION

A known brake control device is disclosed in U.S. Pat. No. 4,989,925 issued on Feb. 5, 1991. The disclosed brake control device includes a master cylinder for generating hydraulic pressure in proportion to a brake pedal operation force, a wheel cylinder (wheel brake) connected with the master cylinder by a main conduit (hydraulic passage), a brake pedal behavior simulator (absorber) disposed at the end of a branch conduit branching from the main conduit, a brake pressure control device, and an electromagnetic valve (control valve). The brake pressure control device is connected with the main conduit between the branch point and the wheel cylinder and is provided with a pressure source. The brake pressure control device applies hydraulic pressure generated by the pressure source and is activated for the purpose of increasing, decreasing and/or maintaining hydraulic pressure in the wheel cylinder. The electromagnetic valve is disposed at the branch point and is activated for establishing and interrupting fluid communication between the master cylinder and the wheel cylinder. When the brake pressure control device is normally operated, the electromagnetic valve functions for establishing the fluid communication between the master cylinder and the brake pedal behavior simulator. On the other hand, when the brake pressure control device malfunctions or is abnormally operated, the electromagnetic valve functions for establishing the fluid communication between the master cylinder and the wheel cylinder.

As described above, the known brake control device includes the electromagnetic valve which changes fluid communication between the master cylinder and the wheel cylinder to fluid communication between the master cylinder and the brake pedal behavior simulator or vice versa in response to the condition of the brake pressure control device. With this type of brake pressure control device, the hydraulic pressure in the wheel cylinder is controlled by the brake pressure control device when the brake pressure control device is normally operated. However, only when the brake pressure control device malfunctions or is abnormally operated, the hydraulic pressure in the wheel cylinder is controlled by the hydraulic pressure from the master cylinder in proportion to the brake pedal operation force.

The brake control device provided with the above-described components and operational characteristics may suffer from several drawbacks, The electromagnetic valve is switched over after initiation of the brake operation is detected by a stroke sensor (pedal effort sensor). Therefore, the known brake control device requires that the electromagnetic valve have sufficiently large suction power capable of opposing the master cylinder hydraulic pressure generated by the brake pedal operation. Further, the electromagnetic valve used in the known device is required to have a high responsiveness so that the driver feels comfortable with the brake pedal operation even during an emergency braking operation. Accordingly, the size and cost associated with the electromagnetic valve are increased.

A need thus exists for a brake control device that permits the electromagnetic valve to be downsized while also minimizing the cost associated with the electromagnetic valve.

SUMMARY OF THE INVENTION

According to one aspect of the invention, a brake control device includes a master cylinder for generating a hydraulic pressure in proportion to a brake pedal operation force, a wheel cylinder connected with the master cylinder by a main conduit extending from the master cylinder, a brake pedal behavior simulator disposed at the branch conduit branching from the main conduit, a normally-open type electromagnetic valve, a normally-closed type electromagnetic valve, and a brake pressure control device that includes a pressure source. The normally-open type electromagnetic valve is disposed in the main conduit between a branch point of the branch conduit and the wheel cylinder, and establishes and interrupts fluid communication between the master cylinder and the wheel cylinder. The normally-closed type electromagnetic valve is disposed in the branch conduit and establishes and interrupts fluid communication between the master cylinder and the brake pedal behavior simulator. The brake pressure control device is connected to the main conduit between the normally-open type electromagnetic valve and the wheel cylinder, and is provided with a pressure source. The brake pressure control device applies hydraulic pressure generated by the pressure source for the purpose of increasing, decreasing, and maintaining hydraulic pressure in the wheel cylinder. When the brake pressure control device is normally operating, the wheel cylinder hydraulic pressure is controlled by the brake pressure control device, with the normally-open type electromagnetic valve being closed and the normally-closed type electromagnetic valve being opened. When the brake pressure control device malfunctions and is abnormally operating, the wheel cylinder hydraulic pressure is controlled by the master cylinder hydraulic pressure in proportion to the brake pedal operation force, and the normally-open type electromagnetic valve is opened and the normally-closed type electromagnetic valve is closed. The reference to malfunctions of the brake pressure control device defines that the pressure source is not actuated to generate a desired hydraulic pressure. Accordingly, the hydraulic pressure for the brake control operation is decreased. Additionally, at least the normally-closed type electromagnetic valve is operated for opening when the brake pedal is in a non-operational state. The reference to the non-operational state of the brake pedal defines that the brake pedal is not applied or the brake pedal is applied with little brake pedal operation force. Accordingly, when the brake pedal is in the non-operational state, the hydraulic pressure from the master cylinder is equal to or lower than a predetermined value.

In the brake control device of the present invention, the normally-closed type electromagnetic valve functions for establishing and interrupting fluid communication between the master cylinder and the brake pedal behavior simulator. The normally-closed type electromagnetic valve is opened only when the brake pedal is in the non-operational state. Therefore, the normally-closed type electromagnetic valve is operated so as to be opened without hydraulic pressure being generated in the master cylinder. Accordingly, the normally-closed type electromagnetic valve is not required to have an extremely large suction power to switch the valve against the master cylinder hydraulic pressure in proportion to the brake pedal operation force. As mentioned above, the normally-closed type electromagnetic valve is operated for opening when the brake pedal is in the non-operational state. Therefore, the normally-closed type electromagnetic valve of the present invention is not required to have a high responsiveness not only when the normal brake is applied but also when a sudden brake is applied. Accordingly, with the brake control device of the present invention, it is possible to downsize the normally-closed type electromagnetic valve and lower the manufacturing cost.

It is quite advantageous that the normally-open type electromagnetic valve for establishing and interrupting fluid communication between the master cylinder and the wheel cylinder is operated for closing when the brake pedal is in the non-operational state as well. Accordingly, the brake control device of the present invention permits a reduction in size and manufacturing cost not only for the normally-closed type electromagnetic valve but also for the normally-open type electromagnetic valve.

According to another aspect of the invention, a brake control device for a vehicle includes a master cylinder for generating a hydraulic pressure in proportion to a brake pedal operation force, a main conduit extending from the master cylinder, a wheel cylinder connected to the master cylinder by the main conduit, a branch conduit branching from the main conduit, a brake pedal behavior simulator disposed at the branch conduit, a first electromagnetic valve disposed in the main conduit between the branch conduit and the wheel cylinder for establishing and interrupting fluid communication between the master cylinder and the wheel cylinder, and a second electromagnetic valve disposed in the branch conduit for establishing and interrupting fluid communication between the master cylinder and the brake pedal behavior simulator. A brake pressure control device is connected to the main conduit between the first electromagnetic valve and the wheel cylinder, and includes a pressure source. The brake pressure control device increases, decreases, and maintains hydraulic pressure in the wheel cylinder by hydraulic pressure generated by the pressure source, with the hydraulic pressure in the wheel cylinder being controlled by the brake pressure control device so that the first electromagnetic valve is closed and the second electromagnetic valve is open when the brake pressure control device is normally operating, and with the hydraulic pressure in the wheel cylinder being controlled by the hydraulic pressure from the master cylinder in proportion to the brake pedal operation force so that the first electromagnetic valve is open and the second electromagnetic valve is closed when the brake pressure control device is malfunctioning. In addition, the first electromagnetic valve is closed only when the brake pedal is in the non-operational state.

In accordance with another aspect of the invention, a brake control device for a vehicle includes a master cylinder for generating a hydraulic pressure in proportion to a brake pedal operation force, a main conduit extending from the master cylinder, a wheel cylinder connected to the master cylinder by the main conduit, a branch conduit branching from the main conduit, a brake pedal behavior simulator disposed at the branch conduit, a first electromagnetic valve disposed in the main conduit between the branch conduit and the wheel cylinder for establishing and interrupting fluid communication between the master cylinder and the wheel cylinder, and a second electromagnetic valve disposed in the branch conduit for establishing and interrupting fluid communication between the master cylinder and the brake pedal behavior simulator. A brake pressure control device is connected to the main conduit between the first electromagnetic valve and the wheel cylinder, and includes a pressure source. The brake pressure control device increases, decreases and maintains hydraulic pressure in the wheel cylinder by hydraulic pressure generated by the pressure source. The hydraulic pressure in the wheel cylinder is controlled by the brake pressure control device, with the first electromagnetic valve being closed and the second electromagnetic valve being open when the brake pressure control device is normally operating. The hydraulic pressure in the wheel cylinder is controlled by the hydraulic pressure from the master cylinder in proportion to the brake pedal operation force, with the first electromagnetic valve being open and the second electromagnetic valve being closed when the brake pressure control device is malfunctioning. The second electromagnetic valve is opened only when the brake pedal is in the non-operational state and the first electromagnetic valve is closed only when the brake pedal is in the non-operational state.

BRIEF DESCRIPTION OF THE DRAWING FIGURES

The foregoing and additional features of the present invention will become more apparent from the following detailed description considered with reference to the accompanying drawing figures in which like elements are designated by like reference numerals and wherein.

DETAILED DESCRIPTION OF THE INVENTION

Figure 1:
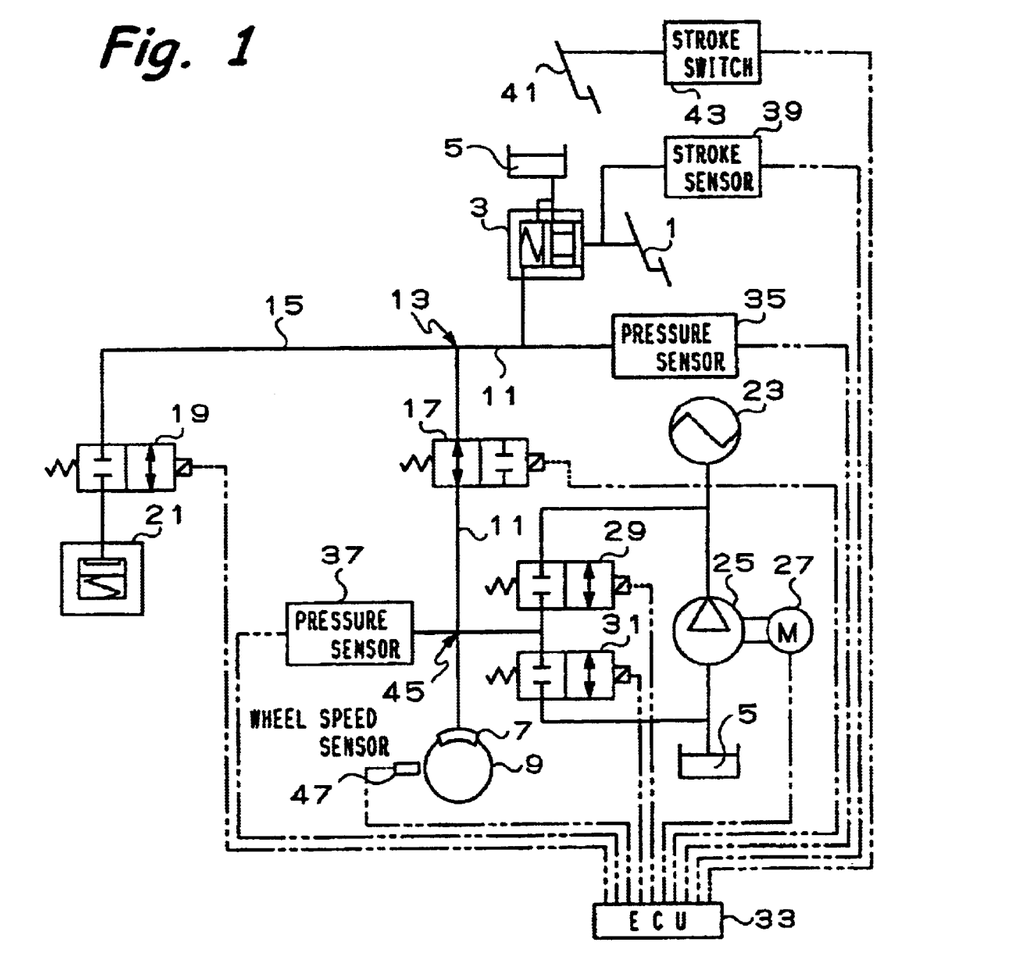
FIG. 1 is a schematic illustration of a brake control device for a vehicle according to the present invention.

The vehicle brake control device of the present invention includes a brake pressure control device and a brake pedal behavior simulator. FIG. 1 schematically illustrates the brake control device for a vehicle. For purposes of simplification, the following description describes the brake control device of the present invention in terms of only one wheel of the vehicle. However, the description also applies to the other wheels of the vehicle.

As shown in FIG. 1, a master cylinder 3 is supplied with hydraulic fluid from a reservoir 5. The master cylinder 3 generates a hydraulic pressure in proportion to the brake pedal operation force applied to a brake pedal 1 by a vehicle driver. The hydraulic pressure from the master cylinder 3 is transmitted to a wheel cylinder 7 through a main conduit 11 and a normally-open type electromagnetic valve 17. The normally-open type electromagnetic valve 17 is a solenoid changeover control valve disposed in the midstream of the main conduit 11. A wheel 9 is operatively associated with the wheel cylinder 7 and is applied with a braking force in response to the brake pedal operation force.

A branch conduit 15 branches at a branch point 13 of the main conduit 11. A brake pedal behavior simulator 21 is disposed at the end of the branch conduit 15, with a normally-closed type electromagnetic valve 19 being disposed between the branch point 13 and the brake pedal behavior simulator 21. The normally-closed type electromagnetic valve 19 is a solenoid changeover control valve that is disposed intermediate the branch conduit 15. The brake pedal behavior simulator 21 can be activated when fluid communication between the master cylinder 3 and the wheel cylinder 7 is interrupted by a closing operation of the electromagnetic valve 17. Thereafter, the hydraulic fluid discharged from the master cylinder 3 in proportion to the brake pedal operation force applied to the brake pedal 1 cannot be consumed in or directed to the wheel cylinder 7. This may cause the driver to feel uncomfortable with the brake pedal operation. To overcome the drawback associated with uncomfortable brake pedal operation, the brake pedal behavior simulator 21 can be activated for purposes of consuming the aforementioned hydraulic fluid from the master cylinder 3 and producing a pseudo brake pedal feeling.

The brake pressure control device to carry out an anti-skid control or other braking controls such as a sudden braking is connected at an intermediate point 45 of the main conduit 11 between the electromagnetic valve 17 and the wheel cylinder 7. Features of the brake pressure control device include a pump 25 serving as a pressure source, an electric motor 27 for driving the pump 25, an accumulator 23 for accumulating hydraulic pressure generated by the pump 25, a normally-closed type electromagnetic valve 29, a normally-closed type electromagnetic valve 31, and a reservoir 5. The electromagnetic valve 29 is a solenoid changeover control valve for increasing the hydraulic pressure in the wheel cylinder 7. The electromagnetic valve 31 is a solenoid changeover control valve for decreasing the hydraulic pressure in the wheel cylinder 7. The reservoir 5 serves to hold the hydraulic fluid drained through the electromagnetic valve 31 and is connected with an inlet port of the pump 25. The hydraulic pressure generated by the pump 25 is normally maintained at a uniform value of high pressure by virtue of a cooperation of the pump 25 and the accumulator 23. When the electromagnetic valve 17 is closed, the brake pressure control device applies the hydraulic pressure generated by the pump 25 for the purpose of increasing, decreasing, and/or maintaining the hydraulic pressure in the wheel cylinder 7. As aforementioned, the changing over operation of the electromagnetic valves 29 and 31 is activated for feeding the high hydraulic pressure generated by the pump 25 into the wheel cylinder 7 or returning the high hydraulic pressure generated by the pump 25 out of the wheel cylinder 7.

As shown in FIG. 1, the brake control device includes various sensors such as a stroke sensor 39 for the brake pedal 1, a stroke switch 43 for an accelerating pedal 41, a hydraulic pressure sensor 35 for detecting the hydraulic pressure generated by the master cylinder 3, a hydraulic pressure sensor 37 for detecting the hydraulic pressure in the wheel cylinder 7 and a wheel speed sensor 47 for detecting a rotation speed of the wheel 9. An ECU 33 shown in FIG. 1 estimates a target hydraulic pressure in the wheel cylinder 7 and controls the electromagnetic valves 19, 17, 29, 31 and the electric motor 27 based upon the output information from various sources, including the above-mentioned sensors and switch.

The hydraulic pressure in the wheel cylinder 7 is controlled by the brake pressure control device while the brake pressure control device is normally operating (i.e., operating in the intended manner) to carry out the anti-skid control or other braking controls such as sudden braking control. However, only while the brake pressure control device malfunctions or is abnormally operated (i.e., operating in a manner not in accordance with the intended manner), the hydraulic pressure in the wheel cylinder 7 is controlled by the hydraulic pressure from the master cylinder 3 in proportion to the brake pedal operation force. As described above, while the brake pressure control device is normally operating (i.e., is operating in the intended manner), each electromagnetic valve 17, 19 must be excited or energized to carry out the anti-skid control or other braking controls such as sudden braking by the brake pressure control device. In this case, the valve 17 is set to be closed and the valve 19 is set to be open. Meanwhile, when the brake pressure control device malfunctions or is abnormally operating (i.e., is operating in a manner not in accordance with the intended manner), each electromagnetic valve 17, 19 must be de-excited or de-energized. In this case, the valve 17 is set to be open and the valve 19 is set to be closed to supply the hydraulic pressure from the master cylinder 3 to the wheel cylinder 7.

In the description below, the term "non-operational state of the brake pedal 1" defines or refers to when the brake pedal 1 is not depressed, or even if the brake pedal 1 is depressed, insufficient hydraulic pressure from the master cylinder 3 is generated. Accordingly, when the brake pedal 1 is in the non-operational state, the hydraulic pressure from the master cylinder 3 is equal to or lower than a predetermined value.

Figure 2A:
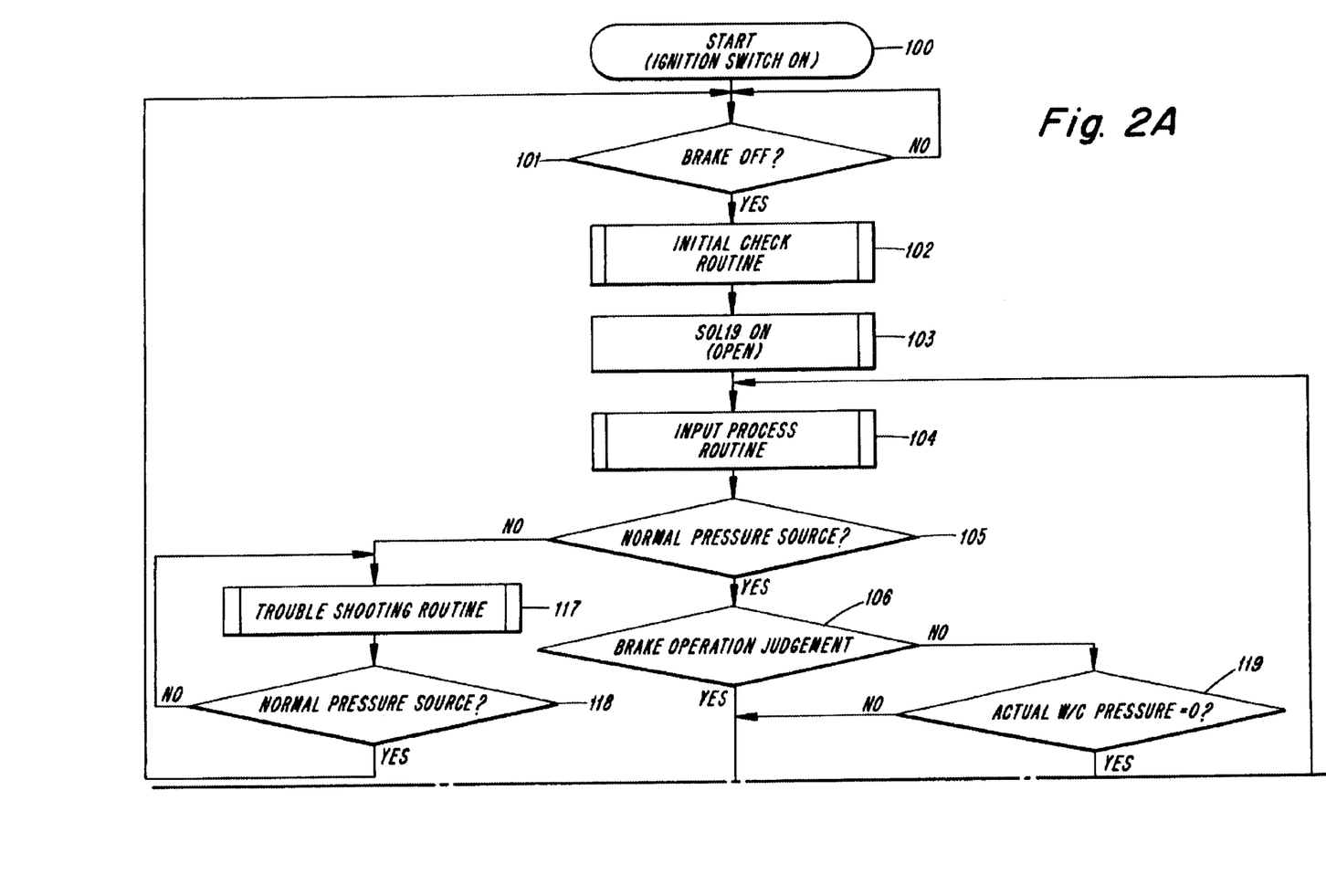
FIGS. 2A and 2B are a flow diagram illustrating the overall brake control operation associated with the brake control device according to a first embodiment of the present invention.
Figure 2B:
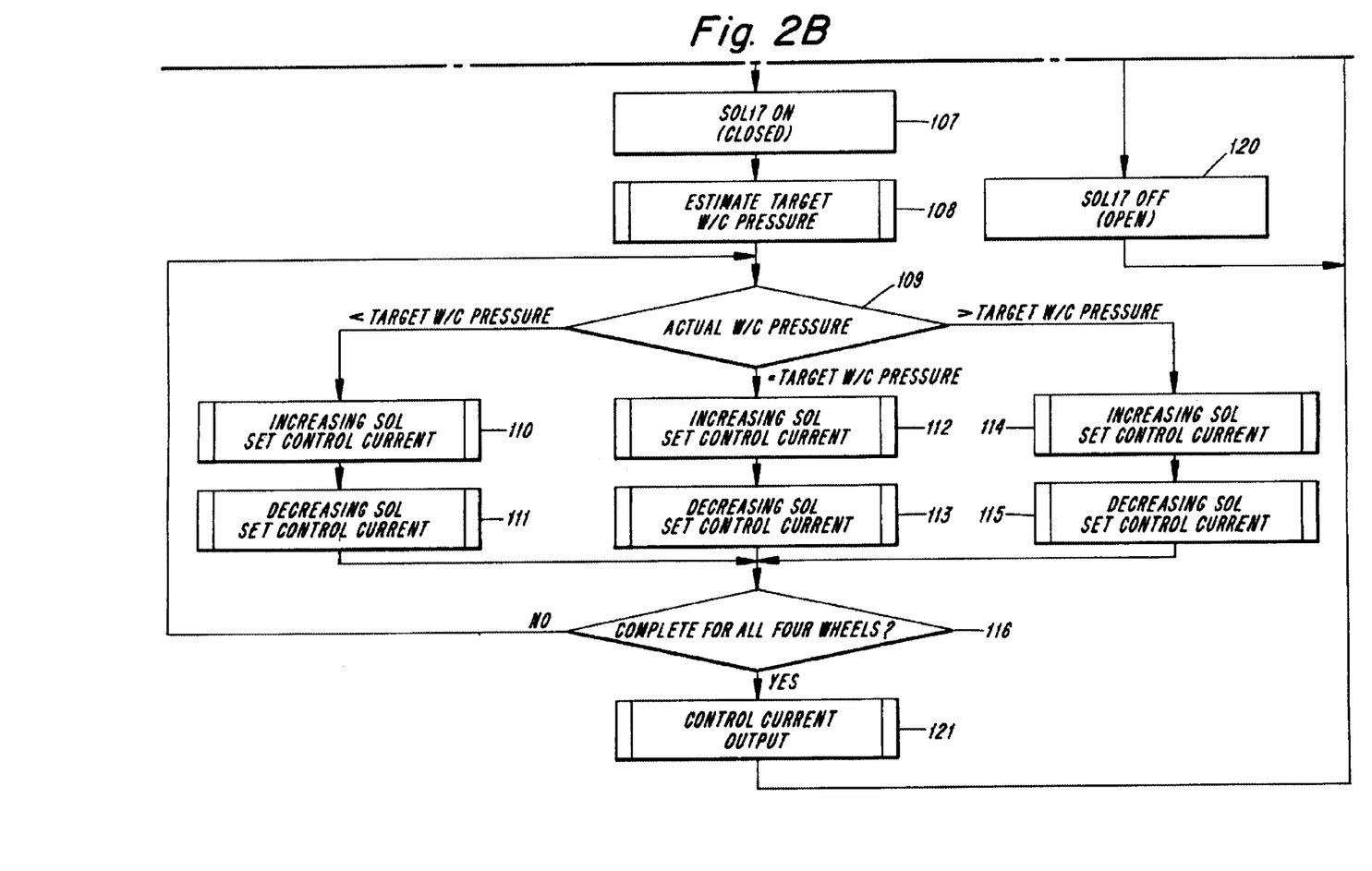

The operation of the brake control device according to an embodiment of the present invention is described below with reference to the flow diagram in FIGS. 2A and 2B which illustrates an overall brake control operation associated with the brake control device shown in FIG. 1. At step 100, an ignition switch of the vehicle is turned on so that the program proceeds to step 101. At step 101, the stroke sensor 39 detects the condition of the brake pedal 1 and outputs signals to the ECU 33. When the brake pedal 1 is applied or depressed, the program stands ready for the non-operational state of the brake pedal 1. When the brake pedal 1 is already in the non-operational state, the program proceeds to step 102 for the purpose of an initial check routine. At step 102, the system determines or verifies that each sensor and each electromagnetic valve are normally operating, and also verifies or determines that each electromagnetic valve is de-excited. After verifying at step 102 of the initial check routine, the program proceeds to step 103.

At step 103, the electromagnetic valve 19 is excited and operated for opening. An indispensable condition at step 103 is that the brake pedal 1 is in the non-operational state, wherein no high hydraulic pressure is supplied from the master cylinder 3 towards a direction upstream of the electromagnetic valve 19. Therefore, the electromagnetic valve 19 of the present invention is not required to have an excessively or sufficiently large suction power for changing the hydraulic circuit. Accordingly, the electromagnetic valve 19 of the present invention can be downsized.

The operation at step 103 for keeping the electromagnetic valve 19 excited and open is continued until pressure source malfunctions are detected or the ignition switch is turned off. Thereafter, the program proceeds to step 104 for the purpose of an input process routine. At step 104, the output signals from each sensor are inputted to the ECU 33.

At step 105, the ECU 33 judges whether or not the pump 25 serving as the pressure source is normally operating. The hydraulic pressure generated by the pump 25 is maintained at a uniform pressure value by virtue of a cooperation of the pump 25 and the accumulator 23 and a continual control by the electric motor 27. When the hydraulic pressure generated by the pump 25 does not attain a predetermined pressure value, the ECU 33 judges that the pressure source is malfunctioning. Accordingly, the program proceeds to step 117 for the purpose of performing a trouble shooting routine of the pressure source. At step 117, the brake control operation by the brake pressure control device is switched to that by the hydraulic pressure from the master cylinder 3 in proportion to the brake pedal operation force. In this case, the electromagnetic valves 17, 19 are de-excited or de-energized. Thereafter, the program proceeds to step 118, and the ECU 33 rechecks whether or not the pressure source is normally operating. If the pressure source is not normally operating, the program is required to return to step 117. The program is maintained at step 117 until the normal operation of the pressure source is resumed.

If the trouble is solved and the normal operation of the pressure source is resumed, the program returns to step 101. At step 101, the brake control operation is resumed from the initial state. Additionally, the above description of the operation at steps 105, 117 and 118 in FIGS. 2A and 2B specifies that the ECU 33 only judges whether or not the pump 25 is malfunctioning. However, malfunction judgments for the ECU 33 and the electromagnetic valves 29, 31 (such as disconnection) may be included in judgment of malfunctioning of the brake pressure control device.

At step 105, when the ECU 33 judges the normal operation of the pressure source, the program proceeds to step 106. At step 106, the ECU 33 judges the condition of the brake pedal 1 based upon the output signals from the stroke sensor 39. This routine is called a brake operation judgment. If the brake pedal 1 is not applied, the program proceeds to step 119, where the ECU 33 judges whether or not the actual hydraulic pressure in the wheel cylinder 7 is zero based upon the output signals from the hydraulic pressure sensor 37. When the hydraulic pressure in the wheel cylinder 7 is set zero, the program proceeds to step 120, wherein the electromagnetic valve 17 is de-exciting or de-energized and thus open. Thereafter, the program returns to step 104. This process or operation for maintaining the electromagnetic valve 17 in the de-excited or de-energized condition advantageously minimizes the excitation or energization time of the valve 17.

At step 119, when the actual hydraulic pressure in the wheel cylinder 7 is not zero, the program proceeds to step 107. At step 106, if the brake pedal 1 is applied, the program proceeds to step 107, wherein the electromagnetic valve 17 is excited or energized and thus closed to carry out the brake control operation by the brake pressure control device.

Thereafter, at step 108, the ECU 33 estimates the target hydraulic pressure for the wheel cylinder 7 based upon the output signals from the stroke sensor 39 and the hydraulic pressure sensor 35. As mentioned above, the output signals from each sensor have been already inputted to the ECU 33 at step 104 for the purpose of the input process routine. At step 109, the estimated target hydraulic pressure in the wheel cylinder 7 is compared with the actual hydraulic pressure in the wheel cylinder 7 which is detected by the hydraulic pressure sensor 37. Based on the results of the comparison at step 109, the program proceeds to one of the following three steps.

When the target hydraulic pressure in the wheel cylinder 7 is equal to the actual hydraulic pressure in the wheel cylinder 7, the program proceeds to steps 112 and 113 to maintain the actual hydraulic pressure in the wheel cylinder 7. At steps 112 and 113, the ECU 33 sets a certain control current value respectively for de-exciting (de-energizing) and closing the electromagnetic valves 29, 31.

When the target hydraulic pressure exceeds the actual hydraulic pressure, the program proceeds to steps 110 and 111 to increase the actual hydraulic pressure in the wheel cylinder 7. At step 110, the ECU 33 sets a certain control current value for exciting (energizing) and opening operation of the electromagnetic valve 29. At step 111, the ECU 33 sets the control current value for de-exciting (de-energizing) and closing the electromagnetic valve 31.

When the actual hydraulic pressure exceeds the target hydraulic pressure, the program proceeds to steps 114 and 115 to decrease the actual hydraulic pressure in the wheel cylinder 7. At step 114, the ECU 33 sets the control current value for de-exciting (de-energizing) and closing the electromagnetic valve 29. At step 115, the ECU 33 sets a certain control current value for exciting (energizing) and opening the electromagnetic valve 31.

At step 116, the ECU 33 judges whether or not the setting of the control current values for each electromagnetic valve 29, 31 applied for all four wheels respectively is completed. If the setting for any of the wheels is not completed, the program returns to step 109 and resumes the estimation at step 109. If the setting for all four wheels is completed, the program proceeds to step 121. At step 121, the ECU 33 generates a control current to each electromagnetic valve 29, 31. In accordance with the generated control current, each valve 29, 31 is switched so that the actual hydraulic pressure in the wheel cylinder 7 is controlled. The program then returns to step 104 and repeats the same routine as explained above.

Figure 3A:
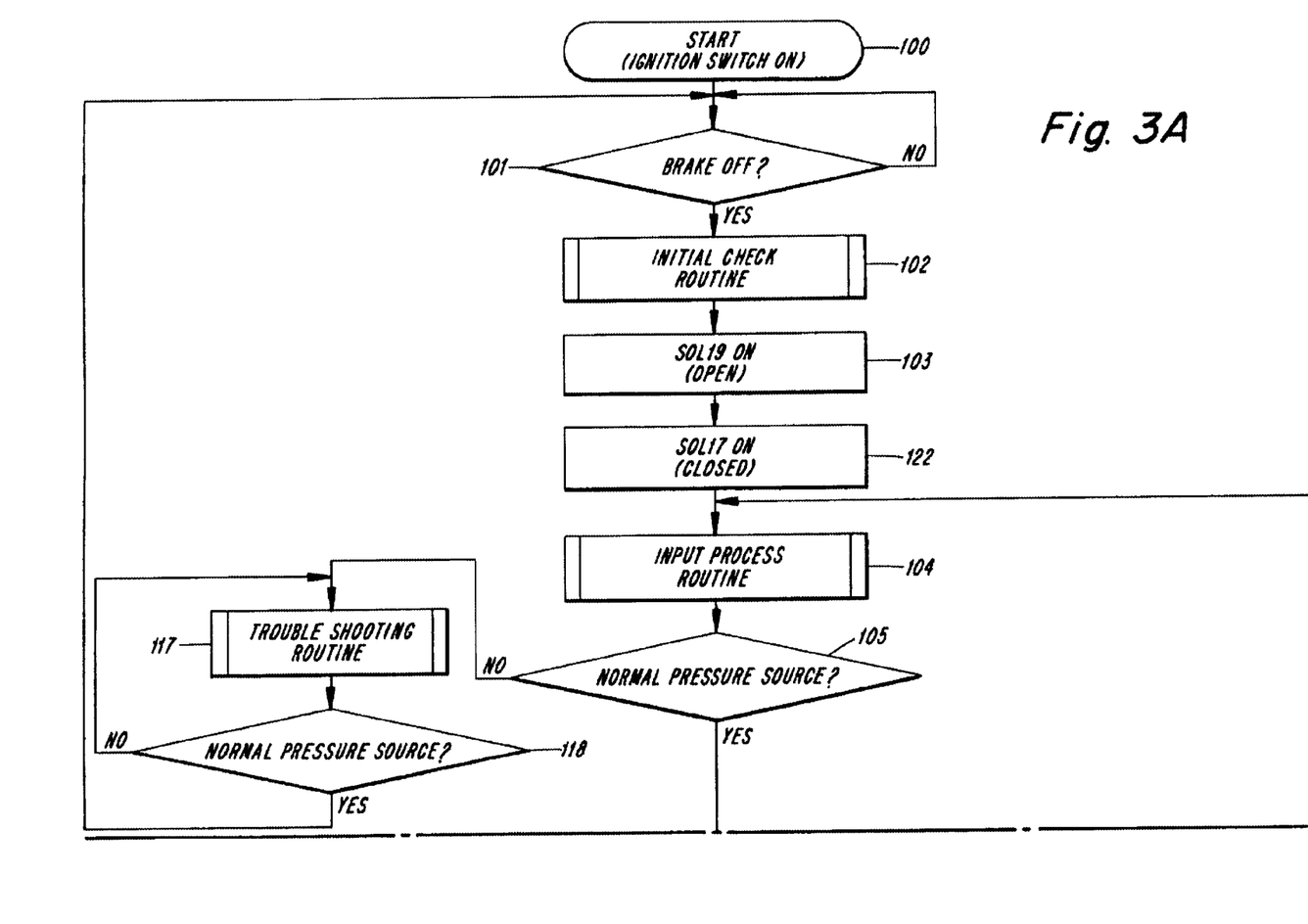
FIGS. 3A and 3B are another flow diagram illustrating the overall brake control operation associated with the brake control device according to a second embodiment of the present invention.
Figure 3B:
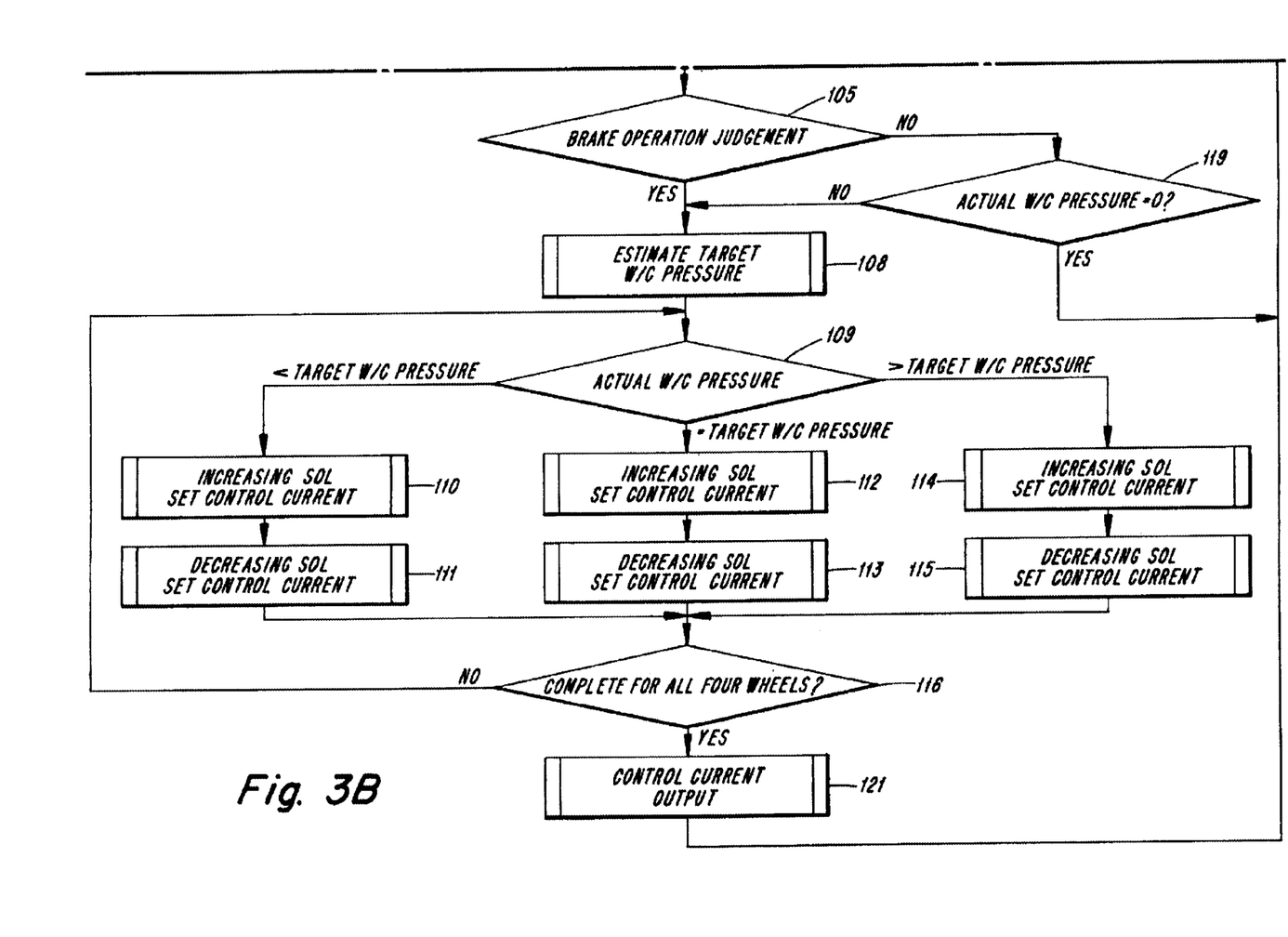

The operation of the brake control device according to a second embodiment of the present invention is described below with reference to the flow diagram in FIGS. 3A and 3B which illustrates the overall brake control operation associated with the brake control device shown in FIG. 1. Steps and operations associated with the second embodiment that are the same as those associated with the first embodiment are denoted by identical notations and a detailed description of such aspects of the invention are not repeated.

The second embodiment differs from the first embodiment with respect to the timing for exciting or energizing the electromagnetic valves 17, 19. According to the second embodiment, the timing to excite (energize) and close the electromagnetic valve 17 corresponds to the timing to excite (energize) and open the electromagnetic valve 19 (referring to step 107 in FIG. 2B and step 122 in FIG. 3A). According to the second embodiment shown in FIGS. 3A and 3B, the indispensable condition of this embodiment is that the brake pedal 1 is in the non-operational state when the changing over of each electromagnetic valve 17, 19 is activated. Therefore, both electromagnetic valves 17, 19 according to the second embodiment are not required to have the excessively or sufficiently large suction power to respectively switch over the valves 17, 19. Furthermore, both electromagnetic valves 17, 19 according to the second embodiment can be downsized.

The operation for keeping the electromagnetic valves 17, 19 excited (energized) to keep the valve 17 closed and to keep the valve 19 open is continued until a pressure source malfunction is detected or until the ignition switch is turned off.

It is to be understood that various alternatives to the above-described embodiments of the present invention are possible. For example, when the stroke of the accelerator pedal 41 detected by the stroke switch 43 is equal to or larger than a predetermined value, the electromagnetic valve 19 is de-excited (de-energized) and closed. On the other hand, when the stroke of the accelerator pedal 41 detected by the stroke switch 43 is smaller than the predetermined value, the electromagnetic valve 19 is excited (energized) and opened again. This alternative is applied from the standpoint that the stroke is equal to or larger than the predetermined value in most of the cases when the accelerator pedal 41 is operated while the brake pedal 1 is in the non-operational state. Therefore, the exciting or energization time of the electromagnetic valve 19 according to this alternative can be minimized, and the durability of the electromagnetic valve 19 is improved.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. A brake control device for a vehicle, comprising:
    a master cylinder for generating a hydraulic pressure in proportion to a brake pedal operation force applied to a brake pedal;
    a main conduit extending from said master cylinder;
    a wheel cylinder connected to said master cylinder by said main conduit;
    a branch conduit branching from said main conduit;
    a brake pedal behavior simulator disposed at said branch conduit;
    a first electromagnetic valve disposed in said main conduit between said branch conduit and said wheel cylinder for establishing and interrupting fluid communication between said master cylinder and said wheel cylinder;
    a second electromagnetic valve disposed in said branch conduit for establishing and interrupting fluid communication between said master cylinder and said brake pedal behavior simulator;
    a brake pressure control device connected to said main conduit between said first electromagnetic valve and said wheel cylinder, said brake pressure control device including a pressure source;
    said brake pressure control device increasing, decreasing, and maintaining a hydraulic pressure in said wheel cylinder by hydraulic pressure generated by said pressure source;
    the hydraulic pressure in said wheel cylinder being controlled by said brake pressure control device in response to a brake pedal operation of the brake pedal with said first electromagnetic valve being closed and said second electromagnetic valve being open when said brake pressure control device is normally operating;
    the hydraulic pressure in said wheel cylinder being controlled by said hydraulic pressure from said master cylinder in proportion to said brake pedal operation force with said first electromagnetic valve being open and said second electromagnetic valve being closed when said brake pressure control device is malfunctioning; and
    said second electromagnetic valve being opened only when said brake pedal is in a non-operational state.

2. The brake control device according to claim 1, wherein said first electromagnetic valve is a normally-open type electromagnetic valve and said second electromagnetic valve is a normally-closed type electromagnetic valve.

3. The brake control device according to claim 1, wherein said pressure source is a pump.

4. The brake control device according to claim 1, wherein said brake pressure control device includes an electric motor for driving the pump, an accumulator for accumulating hydraulic pressure generated by the pump, and a pair of electromagnetic valves.

5. The brake control device according to claim 4, wherein said pair of electromagnetic valves includes a pair of normally-closed type electromagnetic valves.

6. The brake control device according to claim 1, including means for estimating a target wheel cylinder pressure and comparing the estimated wheel cylinder pressure to an actual wheel cylinder pressure.

7. A brake control device for a vehicle, comprising:
    a master cylinder for generating a hydraulic pressure in proportion to a brake pedal operation force applied to a brake pedal;
    a main conduit extending from said master cylinder;
    a wheel cylinder connected to said master cylinder by said main conduit;
    a branch conduit branching from said main conduit;
    a brake pedal behavior simulator disposed at said branch conduit;
    a first electromagnetic valve disposed in said main conduit between said branch conduit and said wheel cylinder for establishing and interrupting fluid communication between said master cylinder and said wheel cylinder;
    a second electromagnetic valve disposed in said branch conduit for establishing and interrupting fluid communication between said master cylinder and said brake pedal behavior simulator;
    a brake pressure control device connected to said main conduit between said first electromagnetic valve and said wheel cylinder, said brake pressure control device including a pressure source;
    said brake pressure control device increasing, decreasing, and maintaining hydraulic pressure in said wheel cylinder by hydraulic pressure generated by said pressure source;
    the hydraulic pressure in said wheel cylinder being controlled by said brake pressure control device in response to a brake pedal operation of the brake pedal with said first electromagnetic valve being closed and said second electromagnetic valve being open when said brake pressure control device is normally operating;
    the hydraulic pressure in said wheel cylinder being controlled by said hydraulic pressure from said master cylinder in proportion to the brake pedal operation force with said first electromagnetic valve being open and said second electromagnetic valve being closed when said brake pressure control device is malfunctioning; and said first electromagnetic valve being closed only when said brake pedal is in a non-operational state.

8. The brake control device according to claim 7, wherein said first electromagnetic valve is a normally-open type electromagnetic valve and said second electromagnetic valve is a normally-closed type electromagnetic valve.

9. The brake control device according to claim 7, wherein said pressure source is a pump.

10. The brake control device according to claim 7, wherein said brake pressure control device includes an electric motor for driving the pump, an accumulator for accumulating hydraulic pressure generated by the pump, and a pair of electromagnetic valves.

11. The brake control device according to claim 10, wherein said pair of electromagnetic valves includes a pair of normally-closed type electromagnetic valves.

12. The brake control device according to claim 7, including means for estimating a target wheel cylinder pressure and comparing the estimated wheel cylinder pressure to an actual wheel cylinder pressure.

13. A brake control device, comprising:
a master cylinder for generating a hydraulic pressure in proportion to a brake pedal operation force applied to a brake pedal;
a main conduit extending from said master cylinder;
a wheel cylinder connected to said master cylinder by said main conduit;
a branch conduit branching from said main conduit;
a brake pedal behavior simulator disposed at said branch conduit;
a first electromagnetic valve disposed in said main conduit between said branch conduit and said wheel cylinder for establishing and interrupting fluid communication between said master cylinder and said wheel cylinder;
a second electromagnetic valve disposed in said branch conduit for establishing and interrupting fluid communication between said master cylinder and said brake pedal behavior simulator;
a brake pressure control device connected to said main conduit between said first electromagnetic valve and said wheel cylinder, said brake pressure control device including a pressure source;
said brake pressure control device increasing, decreasing, and maintaining hydraulic pressure in said wheel cylinder by a hydraulic pressure generated by said pressure source;
the hydraulic pressure in said wheel cylinder being controlled by said brake pressure control device in response to a brake pedal operation of the brake pedal with said first electromagnetic valve being closed and said second electromagnetic valve being open when said brake pressure control device is normally operating;
the hydraulic pressure in said wheel cylinder being controlled by said hydraulic pressure from said master cylinder in proportion to said brake pedal operation force with said first electromagnetic valve being open and said second electromagnetic valve being closed when said brake pressure control device is malfunctioning;
said second electromagnetic valve being opened only when said brake pedal is in a non-operational state; and
and said first electromagnetic valve being closed only when said brake pedal is in a non-operational state.

14. A brake control device according to claim 13, wherein said first electromagnetic valve is a normally-open type electromagnetic valve and said second electromagnetic valve is a normally-closed type electromagnetic valve.

15. The brake control device according to claim 13, wherein said pressure source is a pump.

16. The brake control device according to claim 13, wherein said brake pressure control device includes an electric motor for driving the pump, an accumulator for accumulating hydraulic pressure generated by the pump, and a pair of electromagnetic valves.

17. The brake control device according to claim 16, wherein said pair of electromagnetic valves includes a pair of normally-closed type electromagnetic valves.

18. The brake control device according to claim 13, including means for estimating a target wheel cylinder pressure and comparing the estimated wheel cylinder pressure to an actual wheel cylinder pressure.

* * * * *